Sept. 17, 1968     D. J. DADDONA, JR     3,401,434
SNAP FASTENER ASSEMBLY
Filed May 26, 1966
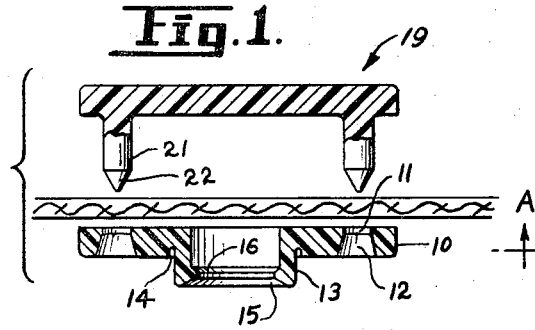
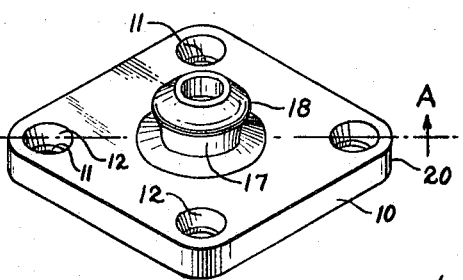
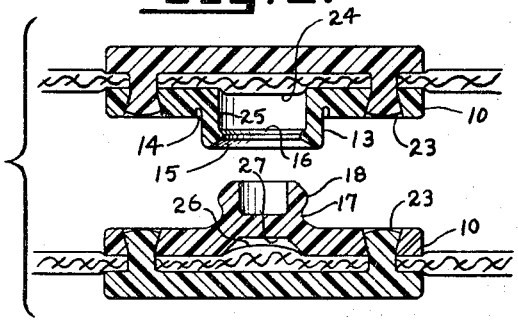
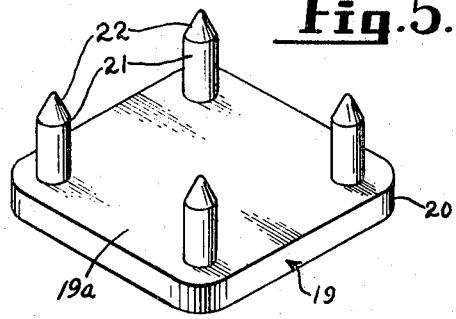
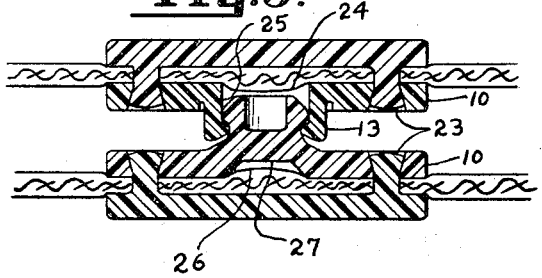
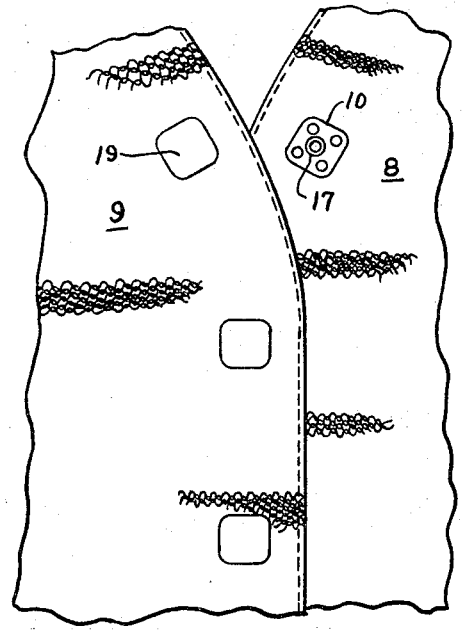

United States Patent Office 3,401,434
Patented Sept. 17, 1968

3,401,434
SNAP FASTENER ASSEMBLY
Domenic J. Daddona, Jr., Waterbury, Conn., assignor to Scovill Manufacturing Company, Waterbury, Conn., a corporation of Connecticut
Filed May 26, 1966, Ser. No. 553,181
2 Claims. (Cl. 24—208)

ABSTRACT OF THE DISCLOSURE

An improved snap fastener in which each fastener part consists of a single piece of molded plastic material, one piece having holes in the corners of a flat base, the other having pins projecting from its flat surface to fit into said holes, the pins being upset in assembly. The fastener is useful for knit fabrics because it grips the fabric between the flat surfaces of the parts at a plurality of areas spaced a substantial distance from the central snap fastener element.

---

This invention is an all-plastic snap fastener assembly improved in such ways as to make it useful for garments of knit material.

Snap fasteners, wherein the fastener element and attaching member are both made of plastic material, are known but have not been successfully used on knit material. The present invention involves a novel combination of structural features which accomplish the following objectives and all of which are necessary to make the fastener practical for knit material:

(1) Securement of the fastener at a plurality of regions around the fastener device itself, the fastening device being either the stud or the socket;
(2) The mechanical feeding of the fastener member and attaching member so that the securing elements are properly registered;
(3) The avoidance of adhesives and stitching operations.

It may be useful to examine the following patents to indicate the known state of the prior art:

The Jones patent does not meet the need because it requires a metal attaching member, and also because of the comparatively thin base flange on the fastener member. The Boser et al. patent employs no attaching member other than stitching which is considered too expensive to use on knit garments. Whereas he shows a fastener member with a square base, this does not suggest a solution to the problem of registering a fastener member with its attaching member. The Belgian patent indicates an all-plastic fastener where the attaching member has hooks to snap into the stud or socket. This is not practical because of the extremely close tolerances required, and in any event, could not be made strong enough, nor could it accommodate variable thicknesses of material. Furthermore, there is no way in which the parts could be mechanically fed in properly registered relationship in an assembling operation.

The object of my invention, therefore, is to provide a novel assembly which will make it practical to employ snap fasteners on knit garments wherein the fastener members and attaching members are entirely of plastic material. To this end, both the fastener base flange and the attaching member are made polygonal, and preferably square, for easy registering of one with the other. The base flange has holes in the corner regions to hold the corners securely to the garment material over the maximum possible area of the garment. The holes in the base flange are preformed so that the pins of the attaching member can penetrate the garment material and enter the holes.

Other objects and advantages of the invention will hereinafter more fully appear.

In the accompanying drawing, I have shown for purpose of illustration, one embodiment which the invention may assume in practice. In the drawing:

FIG. 1 is a cross-section taken diagonally through the base and showing a socket member and associated assembly;

FIG. 2 is a central section, also on the diagonal, and showing the fully assembled parts of both the socket and stud elements disengaged;

FIG. 3 is a view similar to FIG. 2 showing the fastener parts engaged;

FIG. 4 is a perspective view of the stud member and the diagonal line A—A indicates the location of the sectional views;

FIG. 5 is a perspective view of one of the attaching members for either the stud or socket members; and FIG. 6 shows a plurality of fasteners attached to the flaps of a knitted garment.

The socket fasteners are shown applied to the flap 8 of knit material and the stud fasteners applied to the flap 9.

Each fastener member is molded as one piece of a suitable plastic material, such as nylon which is relatively rigid in the thicker sections but has some degree of flexibility in thinner sections. Each fastener member has a base flange 10 which is of generally square contour and has holes 11 located in the corner regions, each hole having a tapered counterbore 12.

The socket member has a tubular wall 13 integrally joined to its base 10 and preferably there is a groove 14 between the wall 13 and the base to give added flexibility. The socket has a lead-in surface 15 and the internal shoulder 16.

The stud element has also a centrally located fastening device in the form of a tubular projection 17 and with an annular bead 18 adapted to snap behind the shoulder 16 when the parts are engaged, as seen in FIG. 3.

The attaching member for the stud member is identical with that for the socket and each attaching member base 19 having a bearing portion 19a which is of the same size and contour as the base flange of its fastener member. As indicated, this shape is preferably square with rounded corners 20. Projecting inwardly from the attaching member are four pins 21 located in the corner regions so as to register the holes 11, and these pins are initially pointed at the ends as indicated at 22 so they may more readily pierce through the knit goods.

Since the fastener members, either in the case of the socket or of the stud, have a square base flange and the attaching member has a similar square contour, they can all easily be hoppered and fed mechanically to the assembling machine with the pins 21 in proper registration with the holes 11. Then the ends of the pins can be upset to form heads 23 in the counterbore 12 so as permanently to anchor the fastener member in place on the knit goods. The anchorage is at four regions, well-spaced from the central fastening device so as to grip as large an area as possible of the knit goods. At the same time, the parts are held firmly at their corners so as to prevent any turning up of these corner portions. It will also be observed in FIGS. 2 and 3 that the knit material bulges at 24 into the central opening 25 of the socket and at 26 into the central recess 27 of the stud so as further to resist any tendency for slippage of the fastener members on the knit material.

The material of the attaching member is preferably one which will permit the ends of the pins to be upset while at room temperature. One material which has been found satisfactory for this use is known by the name of "Delrin."

It will thus be seen that I have for the first time provided a practical all-plastic snap fastener which can be economically manufactured, fed and attached by automatic assembling machines, and wherein the fastener parts are securely anchored to the knit material.

What I claim is:
1. A snap fastener half assembly comprising:
(a) a sheet of at least one thickness of knitted material;
(b) a one-piece fastener member of plastic material having a base flange of polygonal shape, said fastener member having a centrally located fastening device adapted for snap engagement with a mating fastening device, said base flange having a preformed hole therethrough in each of its corner regions with a flat surface of substantial radial extent completely surrounding each hole on the back side of said flange from the fastening device, said surface engaging against one side of the knitted sheet;
(c) a one-piece attaching member of plastic material having a base with an unbroken outer surface and a bearing portion on the back side of the base from outer surface, said attaching member having cylindrical pins extending perpendicularly from its back side in alignment with the holes in the fastener member, said bearing portion presenting an unbroken flat surface between the pins and for substantial radial extent completely surrounding each pin, the bearing portion engaging against the other side of the knitted sheet, the pins extending through the sheet and into the holes respectively, the ends of said pins being upset in said holes for permanently clamping the knitted sheet between the fastener member and the attaching member at a plurality of spaced locations.

2. An assembly as defined in claim 1, wherein both said base flange and the base of the attaching member are of the same shape.

References Cited
UNITED STATES PATENTS

| | | | |
|---|---|---|---|
| 2,698,473 | 1/1955 | Fenton | 24—218 |
| 3,142,088 | 7/1964 | Cravath. | |
| 3,248,768 | 5/1966 | Silver | 24—225 |
| 2,668,340 | 2/1954 | Jones | 24—216 |
| 3,152,376 | 10/1964 | Boser et al. | 24—216 |

FOREIGN PATENTS

| | | |
|---|---|---|
| 70,254 | 10/1915 | Austria. |
| 553,116 | 12/1956 | Belgium. |

BOBBY R. GAY, *Primary Examiner.*

E. SIMONSEN, *Assistant Examiner.*